US012789421B2

(12) United States Patent
Kallestrup

(10) Patent No.: US 12,789,421 B2
(45) Date of Patent: Nov. 10, 2026

(54) METHOD OF MASKING A MOULD FOR MOULDING A WIND TURBINE BLADE SHELL PART

(71) Applicant: LM Wind Power A/S, Kolding (DK)

(72) Inventor: David Kallestrup, Kolding (DK)

(73) Assignee: LM Wind Power A/S, Kolding (DK)

( * ) Notice: Subject to any disclaimer, the term of this patent is extended or adjusted under 35 U.S.C. 154(b) by 0 days.

(21) Appl. No.: 18/693,682

(22) PCT Filed: Sep. 16, 2022

(86) PCT No.: PCT/EP2022/075827
§ 371 (c)(1),
(2) Date: Mar. 20, 2024

(87) PCT Pub. No.: WO2023/046598
PCT Pub. Date: Mar. 30, 2023

(65) Prior Publication Data

US 2024/0391141 A1 Nov. 28, 2024

(30) Foreign Application Priority Data

Sep. 21, 2021 (EP) .................................... 21197907

(51) Int. Cl.
*B29C 33/56* (2006.01)
*B29C 33/00* (2006.01)
(Continued)

(52) U.S. Cl.
CPC ...... *B29C 33/56* (2013.01); *B29C 2033/0094* (2013.01); *B29L 2031/085* (2013.01); *B29L 2031/757* (2013.01)

(58) Field of Classification Search
CPC ................ B29C 33/56; B29C 37/0032; B29C 2033/0094; B29C 2037/0035;
(Continued)

(56) References Cited

U.S. PATENT DOCUMENTS 3,294,018 A * 12/1966 Heonis .................... B41L 13/04 101/115
5,786,028 A * 7/1998 Cantwell ................. B05B 12/24 118/301
(Continued)

FOREIGN PATENT DOCUMENTS

EP 0804327 A1 11/1997
JP 2010-234204 * 10/2010

OTHER PUBLICATIONS

European Search Report Corresponding to EP21197907 on Mar. 15, 2022.

(Continued)

*Primary Examiner* — Katherine A Bareford
(74) *Attorney, Agent, or Firm* — Dority & Manning, P.A.

(57) ABSTRACT

A method of masking a mould for moulding a wind turbine blade shell part, the method comprising the steps of: arranging a masking device in a mould so that the masking device covers the non-coating zone of the mould surface, spraying a coating onto a mould surface of the mould so that the coating is applied to a coating zone of the mould surface and prevented from being applied to a non-coating zone of the mould surface by the arrangement of the masking device, and removing the masking device from the mould so that the non-coating zone is exposed. The masking device is configured so that, upon terminating spraying of the coating at the first longitudinal boundary of the coating zone, a lip portion of the masking device is separated from the coating applied on the coating zone by a gap.

11 Claims, 6 Drawing Sheets

(51) Int. Cl.
*B29L 31/00* (2006.01)
*B29L 31/08* (2006.01)

(58) Field of Classification Search
CPC ........... B29D 99/0028; B29L 2031/085; B29L 2031/757; Y02E 10/72; B05B 12/24
See application file for complete search history.

(56) References Cited

U.S. PATENT DOCUMENTS

| | | | | |
|---|---|---|---|---|
| 6,071,619 | A | 6/2000 | De Winter | |
| 2001/0000096 | A1* | 4/2001 | Tolerico | B65H 35/0026 156/200 |
| 2012/0138218 | A1* | 6/2012 | Dean | B29D 99/0028 156/243 |
| 2015/0151321 | A1 | 6/2015 | Brett | |
| 2020/0009609 | A1* | 1/2020 | Stilin | B05D 1/325 |

OTHER PUBLICATIONS

PCT International Search Report Corresponding to PCT/EP2022/075827 on Jan 17, 2023.

* cited by examiner

METHOD OF MASKING A MOULD FOR MOULDING A WIND TURBINE BLADE SHELL PART

RELATED APPLICATIONS

The present application claims priority to PCT Application Serial Number PCT/EP2022/075827, filed Sep. 16, 2022, which claims priority to EP Application Serial No. 21197907.5, filed Sep. 21, 2021. Both applications are incorporated by reference herein in their entirety.

TECHNICAL FIELD

The present disclosure relates to a method of masking a mould for moulding a wind turbine blade shell part.

BACKGROUND

Modern day wind turbine blades typically comprise multiple shell parts, such as suction and pressure side shell parts, that are bonded together to form a closed shell. When moulding such wind turbine blade shell part in a mould, the first step is typically to apply a coating to a mould surface of the mould. This applied coating becomes part of the outer coating of the wind turbine blade after the shell part has been infused and cured. However, at this stage, coating is typically not desirable near the bond line to ensure good bonding of the shell parts. Thus, when applying coating on the mould surface, care is taken to avoid applying coating on a non-coating zone of the mould surface adjacent to a longitudinal mould edge of the mould. In prior art methods this is often achieved by arranging a strip of masking tape on the non-coating zone, applying the coating to the coating zone, and then removing the masking tape. Such a method works reasonably well when the masking tape is removed before the coating dries but often leaves a rather sharp step in coating thickness at the boundary. If the masking tape is not removed before coating is dry, the removal of the masking tape often results in peeling of the coating on the coating zone leaving a jagged boundary. This can especially be a problem when the coating is applied autonomously since often the coating is applied in a single pass and afterwards the masking tape can be removed.

After moulding the shell part in the mould, the wind turbine blade is bonded along the bond line and another round of coating is applied to the bond line and the non-coated zone to achieve a uniform outer coating of the wind turbine blade. However, a sharp step in coating thickness at the boundary of the coating zone makes it difficult to provide a uniform coating thickness. In some cases, further post-processing is required such as grinding or sanding the sharp step to a gentle slope. Likewise, when the boundary of the coating zone is jagged, burdensome post-processing can be required, e.g. a full sanding of the boundary to achieve a substantial straight boundary, or even discarding the applied coating and reapplying to the mould surface if observed prior to moulding the shell part.

SUMMARY

On this background, it may be seen as an object of the present disclosure to provide a method of masking a mould for moulding a shell part for a wind turbine blade which at least mitigates some of the above drawbacks of the prior art.

One or more of these objects may be met by aspects of the present disclosure as described in the following.

A first aspect of the present disclosure relates to a method of masking a mould for moulding a shell part for a wind turbine blade, the wind turbine comprising an aerodynamic shell body with a suction side shell part and a pressure side shell part that extends in a longitudinal direction between a root and a tip and in a transverse direction between a leading edge and a trailing edge, wherein the method comprises the steps of:

providing:

- a mould for moulding a shell part, such as the suction or pressure side shell part, of the wind turbine blade, the mould comprising a mould surface having a longitudinal mould edge, a coating zone, and a non-coating zone, the coating zone having a first longitudinal boundary arranged towards the non-coating zone, and the non-coating zone extending longitudinally and extending from the longitudinal mould edge to a second boundary towards the coating zone, and
- a masking device comprising a lip portion including a longitudinal masking edge preferably extending along the longitudinal direction:

arranging the masking device in the mould so that the masking device covers the non-coating zone of the mould surface and so that the longitudinal masking edge of the masking device delimits the first longitudinal boundary of the coating zone;

spraying a coating, such as a gelcoat, onto the mould surface so that the coating is applied to the coating zone, and so that coating is prevented from being applied to the non-coating zone by the arrangement of the masking device; and removing the masking device from the mould so that the non-coating zone is exposed:

wherein the masking device is configured so that, upon terminating spraying of the coating at the first longitudinal boundary of the coating zone, the lip portion of the masking device is separated from the coating applied on the first longitudinal boundary of the coating zone by a gap.

By arranging the masking device so that a gap between the wet coating and the lip portion of the masking device is present when terminating spraying of coating may provide the advantage of allowing the coating to dry without risking peeling off parts of the coating when subsequently removing the masking device from the mould. Accordingly, the quality of the moulded wind turbine blade shell part is improved. Allowing the masking device to stay on the mould for an extended period while the coating dries may further increase the flexibility of the coating process. For instance, an operator can perform other tasks while the coating dries instead of being required to promptly remove the masking device after coating application. Further, such a method may allow the spray coating process to be automated, e.g. by a spray coating robot, while the masking device may still be manually removed. In some automated spray coating processes, operators are not allowed near the mould while the spray coating robot applies the coating. Therefore, the coating applied at one end of the mould may dry before an operator can remove the masking device and before the spray coating process has finished. The present method advantageously provides a gap between the lip portion of the masking device and the applied coating that allow removal of the masking device even when the applied coating has dried without risking peeling of the dry coating.

In the context of the present disclosure, both the mould and the resulting shell part for a wind turbine blade extend along the same longitudinal direction.

Additionally or alternatively, the mould surface may comprise a transition zone that extends longitudinally along the longitudinal direction. The transition zone may extend from the first longitudinal boundary of the coating zone to the second boundary of non-coating zone. The lip portion may be arranged so that during spraying of the coating at the first longitudinal boundary, coating is partially applied through the gap to the transition zone beneath the lip portion of the masking device. The lip portion of the masking device may be arranged so that a coverage and/or thickness of the coating applied to the transition zone gradually decreases from the first longitudinal boundary of the coating zone, e.g. 100% coverage and/or 100% of the coating thickness on the coating zone, to the second boundary of the non-coating zone, e.g. so that no coating is present on the second boundary.

Compared to a prior art method resulting in a sharp boundary line between the coating zone and the non-coating zone, such as a method involving masking tape, a transition zone with gradual coating coverage may prove advantageous in a post-moulding process. After bonding the suction and pressure side shell parts along a bond line, a second coating similar or identical to the coating applied to individual shell parts is applied to the area delimited by the first longitudinal boundary of the suction side shell part and the first longitudinal boundary of the pressure side shell part. When the shell parts include a transition zone, the second coating can be applied on transition zones along with the non-coating zones of the shell parts to achieve a uniform coating. Such a uniform coating avoids edges or coating thickness steps between the coating zones and the non-coating zones of the shell parts. In particular, the method may advantageously avoid a coating thickness step at the first longitudinal boundaries or a post-process of eliminating such a step. The present method instead provides a coating that gradually increases in coverage and/or thickness from the non-coating zone to the coating zone that advantageously allows easy post-moulding process of applying the second coating to obtain a uniform coating on the entire surface of the suction and pressure side shell parts including on the bond line.

Additionally or alternatively, the coverage of the coating applied to the transition zone may decrease from 100% at the first longitudinal boundary to 0% at the second boundary. The first longitudinal boundary and the second boundary may be parallel and may be separated by a distance of 0.5-10 cm, preferably 1-5 cm, more preferably 2-3 cm.

Additionally or alternatively, the masking device may be biased to urge the lip portion away from the mould surface so that, upon terminating spraying of the coating at the first longitudinal boundary of the coating zone, the lip portion returns to a position in which the lip portion of the masking device is separated from the coating applied on the first longitudinal boundary of the coating zone by the gap.

Additionally, the lip portion may have a resting position in which the lip portion extends non-parallel to and/or is angled away from to mould surface.

Additionally or alternatively, the masking device may comprise a body portion and a separation element. The separation element may be arranged between the body portion and the lip portion of the masking device and at a distance to the longitudinal masking edge. Further, the step of arranging the masking device in the mould may comprise contacting the separation element with the non-coating zone of the mould surface so that the gap separating the lip portion of the masking device from the coating applied on the first longitudinal boundary of the coating zone is provided by the separation element.

During spraying of the coating on the coating zone, especially near or at the first longitudinal boundary, pressure is applied to the masking device forcing it towards the mould surface. By including such a separation element, the pressure is transmitted to the mould surface via the separation element so as to provide the gap between the lip portion of the masking device and the coating applied on the first longitudinal boundary of the coating zone during and upon termination of the application of coating on the coating zone near or at the first longitudinal boundary.

Additionally, the separation element may be formed by a protrusion of the masking device and wherein the separation element preferably contacts the mould surface non-adhesively. Alternatively, the separation element may be formed separately from the masking device, and the separation element may preferably adhesively contact the mould surface.

By providing the masking device with a protrusion forming the separation element allows handling of the masking device as a single entity thus easing arrangement of the masking device in the mould. Further, in a typical mould setup, the mould surface is coated with a slip coating which allows the moulded shell part to more easily be removed from the mould without sticking to the mould. By contacting the separation element non-adhesively with the mould surface may allow a wider range of slip coatings on the mould surface since the slip coating does not have allow the separation element to stick to the mould surface. Further, such a separation element may allow easy removal of the mould device.

Additionally or alternatively, the method may comprise a step of arranging one or more clamps on the masking device so as to clamp the masking device to the mould surface.

This may reduce or eliminate the risk of the masking device being dislocated by pressure applied by the coating spraying process.

Additionally or alternatively, the gap between the lip portion of the masking device and the coating applied on the first longitudinal boundary of the coating zone may be at least 0.1 mm, preferably at least 0.5 mm, more preferably at least 1.0 mm.

Additionally or alternatively, the gap between the lip portion of the masking device and the mould surface may be at least 1.0 mm, preferably at least 1.5 mm, more preferably at least 2.0 mm.

Additionally or alternatively, a width of the non-coating zone from the longitudinal mould edge to the second boundary may be in the range of 100-500 mm, preferably in the range of 200-400 mm.

Additionally or alternatively, the width of the non-coating zone in a tip region of the mould may be in the range of 200-300 mm, and/or the width of the non-coating zone in a root region of the mould may be in the range of 300-400 mm.

Additionally or alternatively, the masking device may comprise a plurality of individual masking elements each having a lip portion with a longitudinal masking edge. The step of arranging the masking device in the mould may comprise arranging the plurality of masking elements so that longitudinal masking edge of each masking element extends in parallel and substantially coincides to delimit the first longitudinal boundary of the coating zone.

Such a method may be especially advantageous for moulds for longer wind turbine blades as each masking element may be made of a size and weight that can be handled by a single operator.

Additionally or alternatively, the masking device may comprise or consist essentially of a polymer material, such as silicone or EPDM rubber.

Additionally or alternatively, the step of arranging the masking device in the mould may comprise attaching the masking device to the mould, e.g. to a mould flange of the mould. This step may be achieved by attaching the plurality of clamps to the masking device thus clamping the masking device to the mould surface of the mould.

A second aspect of this disclosure relates to a masking device for use in a method according to the first aspect of present disclosure.

A third aspect relates to a use of a masking device in a method according to the first aspect of the present disclosure.

A person skilled in the art will appreciate that any one or more of the above aspects of this disclosure and embodiments thereof may be combined with any one or more of the other aspects of this disclosure and embodiments thereof.

BRIEF DESCRIPTION OF THE DRAWINGS

Embodiments of this disclosure will be described in more detail in the following with regard to the accompanying figures. The figures show one way of implementing the present invention and are not to be construed as being limiting to other possible embodiments falling within the scope of the attached claim set.

DETAILED DESCRIPTION OF THE INVENTION

In the following figure description, the same reference numbers refer to the same elements and may thus not be described in relation to all figures.

Figure 1:
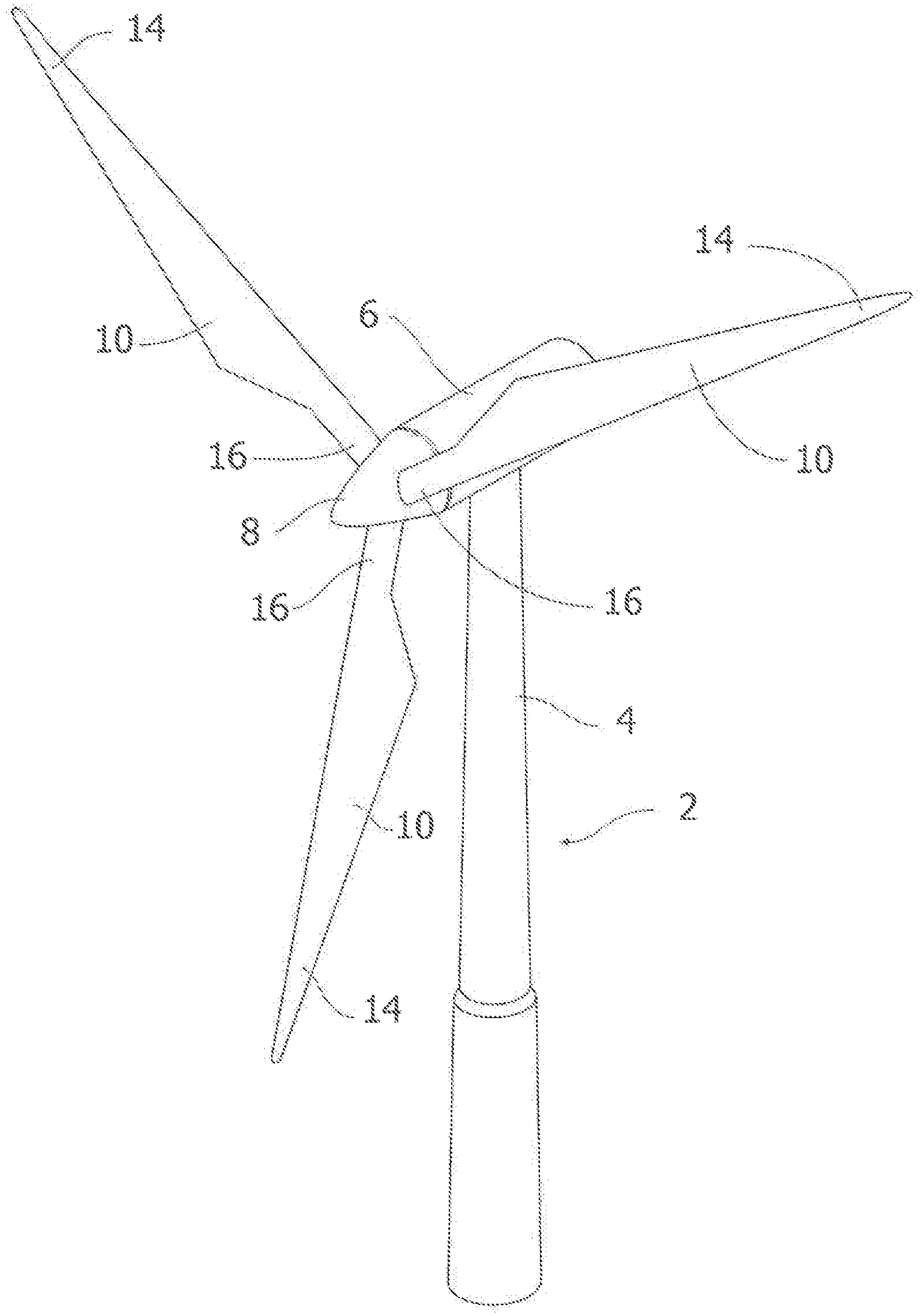
FIG. 1 is a schematic perspective view of a wind turbine.

FIG. 1 illustrates a conventional modern upwind wind turbine 2 according to the so-called "Danish concept" with a tower 4, a nacelle 6 and a rotor with a substantially horizontal rotor shaft which may include a tilt angle of a few degrees. The rotor includes a hub 8 and three blades 10 extending radially from the hub 8, each having a blade root 16 nearest the hub and a blade tip 14 furthest from the hub 8.

Figure 2:
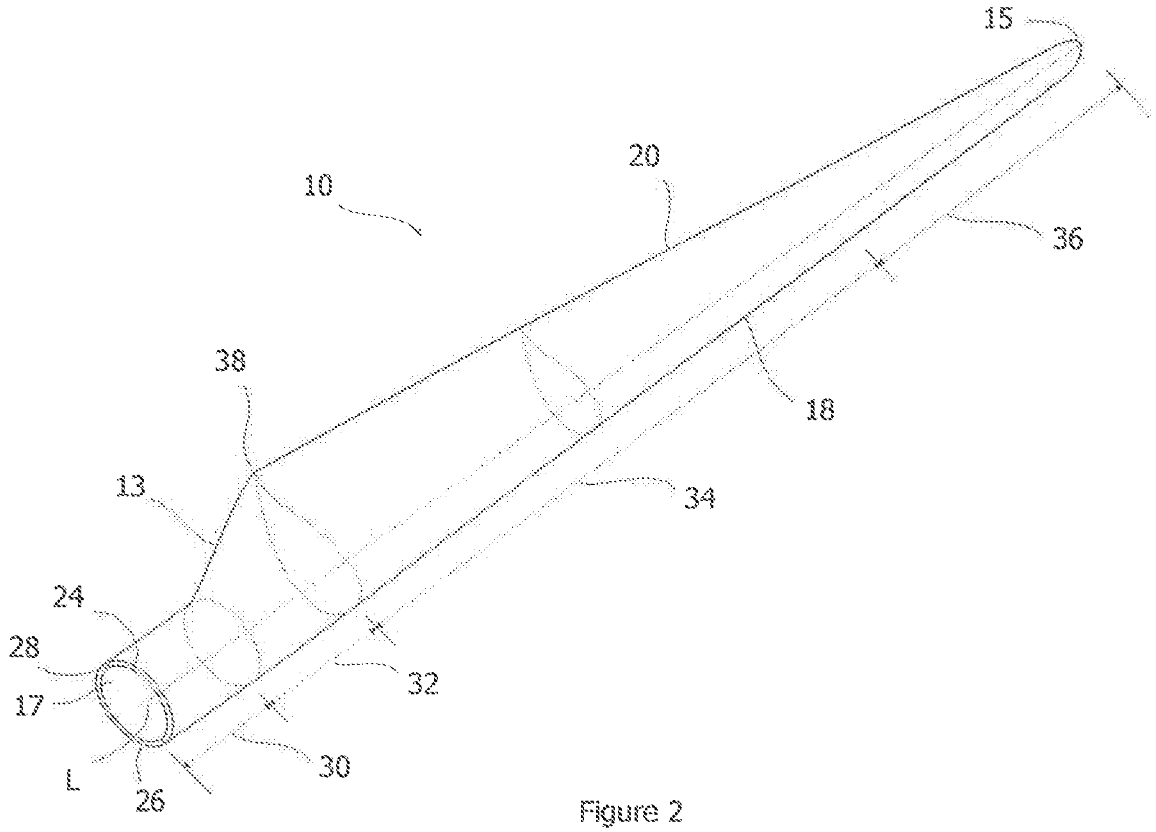
FIG. 2 is a schematic perspective view of a wind turbine blade for a wind turbine as shown in FIG. 1.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The airfoil region has a tip region 36 closest to the tip 15 of the blade. The blade 10 comprises a leading edge 18 facing the direction of rotation of the blade 10, when the blade is mounted on the hub 8, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root region 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 38 of the blade 10 is defined as the position, where the blade 10 has its largest chord length. The shoulder 38 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade 10 is typically made from a pressure side shell part 24 and a suction side shell part 26 that are glued to each other along bond lines 28 at the leading edge 18 and the trailing edge 20 of the blade to form an aerodynamic shell body of the wind turbine blade 10.

Figure 3:
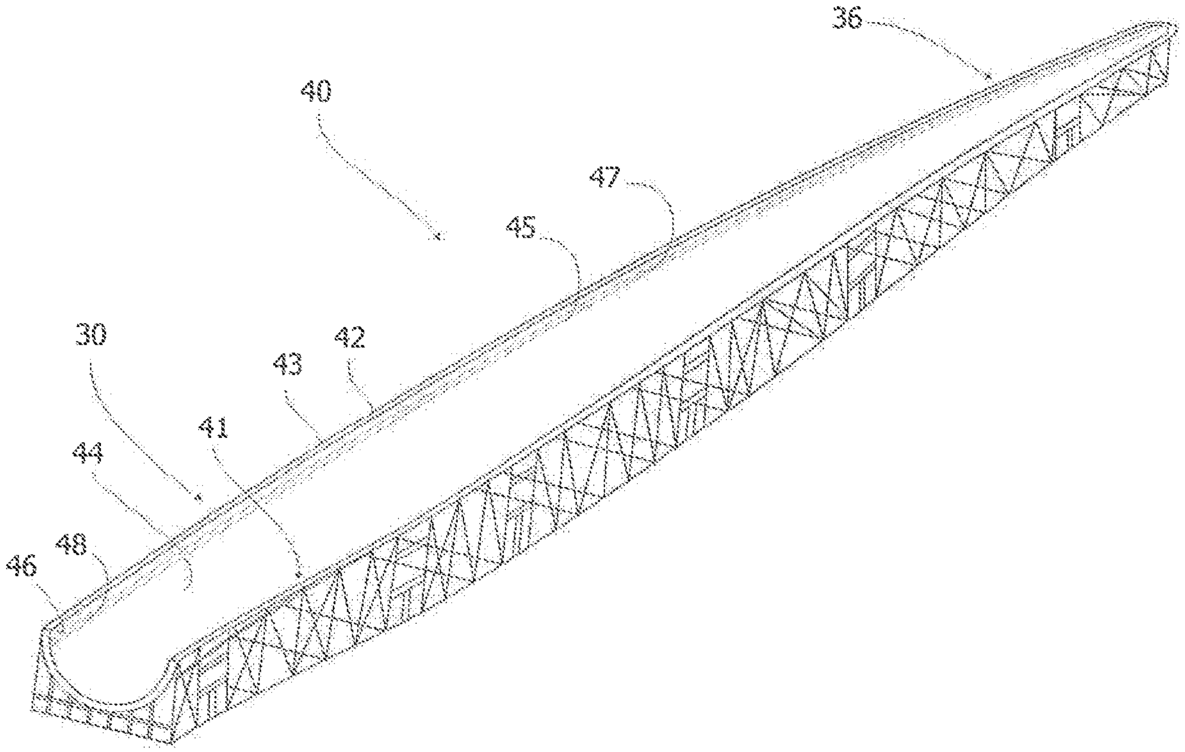
FIG. 3 is a schematic perspective view of a mould for moulding a wind turbine blade shell part.

FIG. 3 illustrates a mould 40 for moulding a shell part, such as the suction side shell part 26 or pressure side shell part 24 of the wind turbine blade 10 (as shown in FIG. 2). The mould 40 has a root region 30 for moulding the root 16 of the wind turbine blade 10 and a tip region 36 for moulding the tip 14 of the wind turbine blade 10. The mould 40 comprises a mould surface 41 with a longitudinal mould edge 42, a coating zone 44, a transition zone 48, and a non-coating zone 46. The coating zone 44 has a first longitudinal boundary 45 arranged towards the non-coating zone 46. The non-coating zone 46 extends longitudinally along the mould 40 and further extends from the longitudinal mould edge 42 to a second boundary 47 towards the coating zone 44. The transition zone 48 extends from the first longitudinal boundary 45 of the coating zone 44 to the second boundary 47 of non-coating zone 46.

Figure 4:
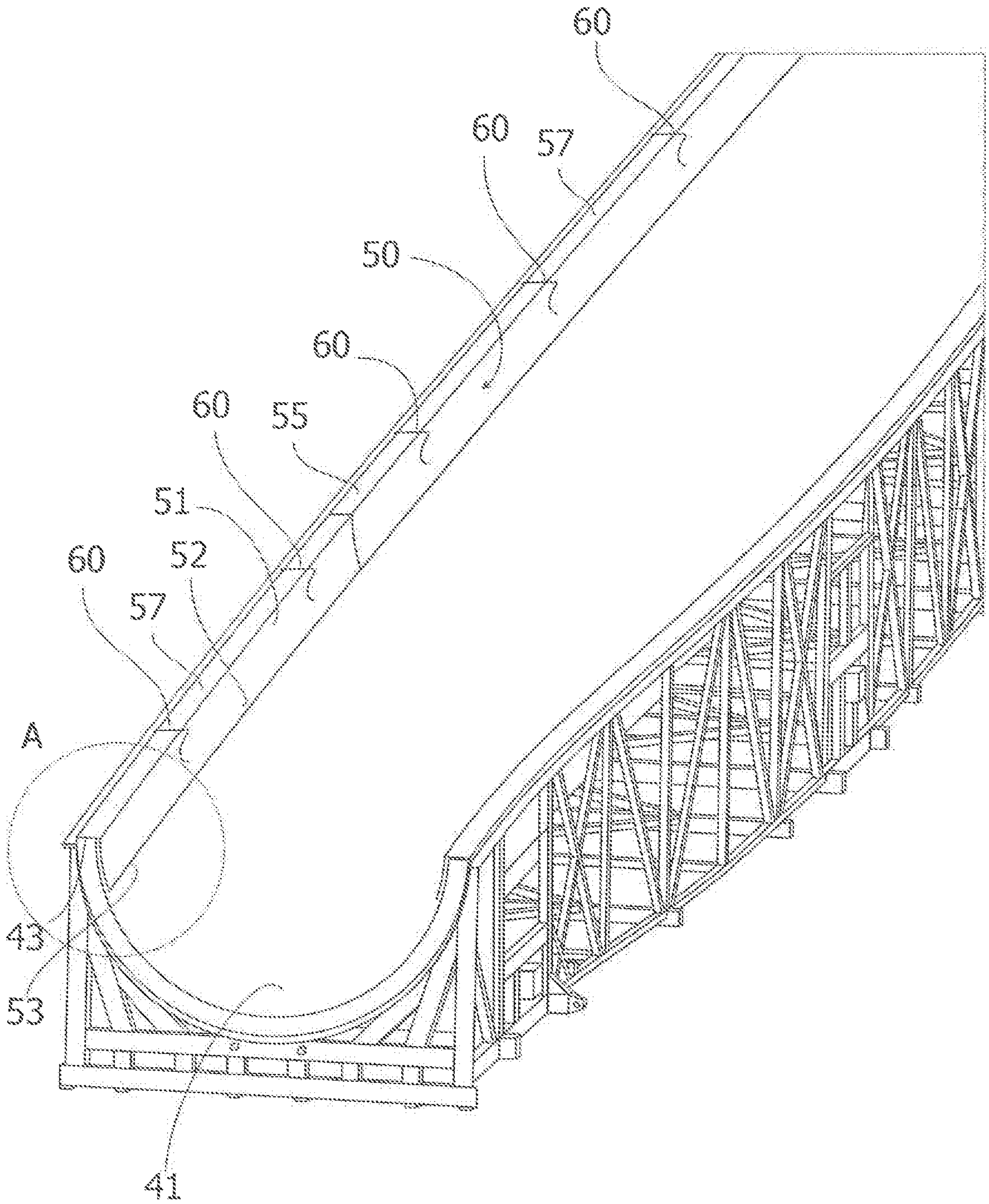
FIG. 4 is schematic perspective view of a root region of the mould as shown in FIG. 3 including a masking device and illustrating a detail view A.

Before applying a coating to the coating zone 44, the mould 40 is masked. This is performed by providing a masking device 50 comprising a lip portion 52 including a longitudinal masking edge 53 extending along the longitudinal direction of the mould 40. The masking device 50 is then arranged in the mould 40 as shown in FIG. 4. In the present embodiment, the masking device 50 is divided into separate masking elements 57 but the masking device 50 may in other embodiments be formed in one piece. A plurality of clamps 60 that reaches around the mould flange 43 and forcing the masking device 50 onto the mould surface 41 thereby attaching the masking device to the mould 40. In this arrangement, the masking device 50 covers the non-coating zone 46 of the mould surface 41 by overlapping the transition zone 48 and extending to the first longitudinal boundary 45 of the coating zone 44 as best seen in FIGS.

Figure 5:
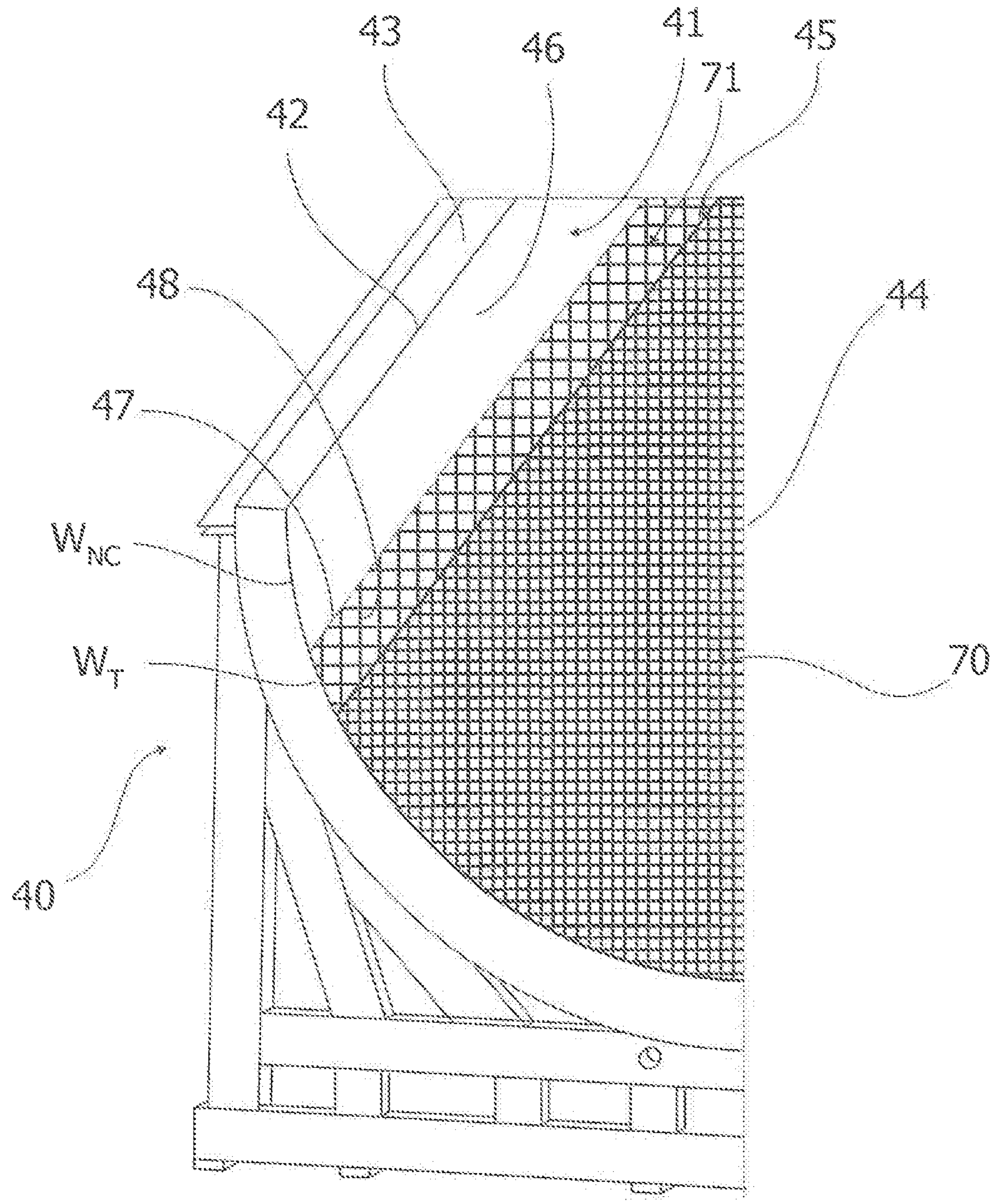
FIG. 5 is a schematic view of a root region of the mould as shown in FIG. 3 after application of coating.

6A-6D. Thus, the longitudinal masking edge 53 of the masking device 50 delimits the first longitudinal boundary 45 of the coating zone 44. Further, a gap G separates the lip portion 52 of the masking device 50 and the first longitudinal boundary 45 of the coating zone 44. The gap G as measured from the mould surface 41 to the longitudinal masking edge 53 is at least the maximum coating thickness together with a safety tolerance, such as between 1.0-10 mm. The masking device is configured so that, upon terminating spraying of the coating at the first longitudinal boundary 45 of the coating zone 44, the lip portion 52 of the masking device 50 is separated from the coating 70 (as shown in FIG. 5) applied on the first longitudinal boundary 45 of the coating zone 44 by the gap G. This can be achieved by the masking devices 50 as shown in FIG. 6A-6D which are discussed in more detail below. In principle, the gap G needs only be present while the coating has not yet dried. Thus, in some embodiments, the lip portion 52 is forced to contact the mould surface 41 by the spray force of the coating being applied but once the spray force stops, the lip portion returns to its original shape to provide the gap G between the lip portion 52 and the mould surface 41. After application of the coating and even after the coating has dried, the masking device 50 can be removed from the mould 40 to reveal the zones 44, 46, 48 of the mould surface 41. As shown in FIG. 5, a full layer of coating has been applied onto the coating zone 44, while a layer of coating that gradually decreases in thickness and/or coverage has been applied to the transition layer 48 (which is often seen as a "cloudy" or spotted layer), and no coating has been applied to the non-coating zone 46. The coverage of the coating applied to the transition zone 48 decreases from 100% at the first longitudinal boundary 45 to 0% at the second boundary 47. The first longitudinal boundary 45 and the second boundary 47 are parallel and may in some cases be distanced from each other by 2-3 cm.

Turning to FIGS. 6A-6D, four embodiments of a masking device 50 are shown. All embodiments of the masking device 50 have an attachment portion 55 which is fixed to the mould 40, in particular the mould flange 43. However, different embodiments are envisioned but not shown in which the masking device is suspended in the mould 40 without being necessarily fixed to the mould 40. The coating is sprayed substantially perpendicularly to the coating zone 44 via a spray nozzle 72 as schematically shown in the figures.

Figure 6A:
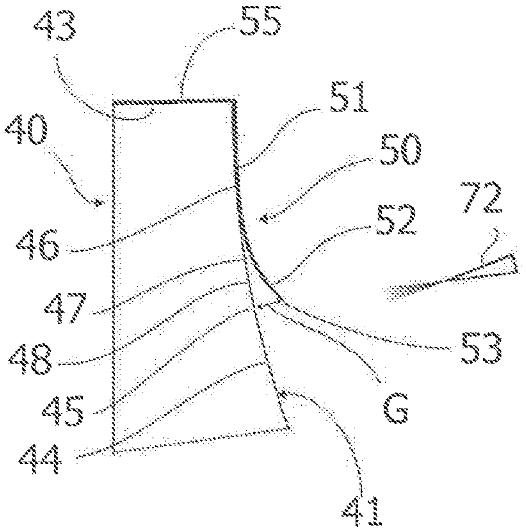
FIGS. 6A-6D are schematic cross-sectional views at the detail view A of masking devices arranged in the mould.

In FIG. 6A, a first embodiment of the masking device 50 is shown in which both the body portion 51 and the lip portion 52 extend along the longitudinal direction (through the plane of FIG. 6A) and along a transverse direction (in the plane of FIG. 6A). The body portion 51 lies substantially flat against the mould surface 41 and the lip portion 52 curved outwards away from the mould surface 41. The masking device 50 has sufficient weight and stiffness so that during spraying of the coating, the gap G does not substantially diminish and is thus preserved during the application of the coating. Such sufficient weight and stiffness depend on the spray force of the spray nozzle 72 and on the characteristics of the coating.

Figure 6B:
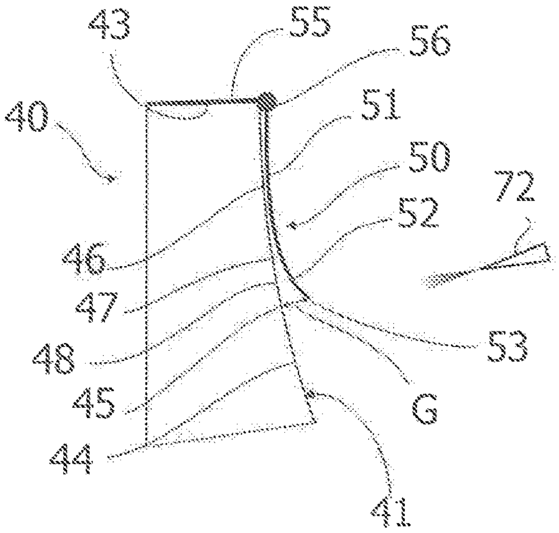

The second embodiment shown in FIG. 6B, differs from the first embodiment shown in FIG. 6A in that a body joint 56 is arranged between the body portion 51 and the attachment portion 55. This body joint 56 allows the body portion 51 to flex about the body joint 56 relative to the attachment portion 55. This enables the provision of a relatively rigid body portion 51 and lip portion 52 while allowing the body portion 51 and the lip portion 52 to conform to the changing gradient of the mould surface 41 along the longitudinal direction (through the plane of the FIG. 6B). The body joint 56 can be provided as a hinge, such as a living hinge.

Figure 6C:
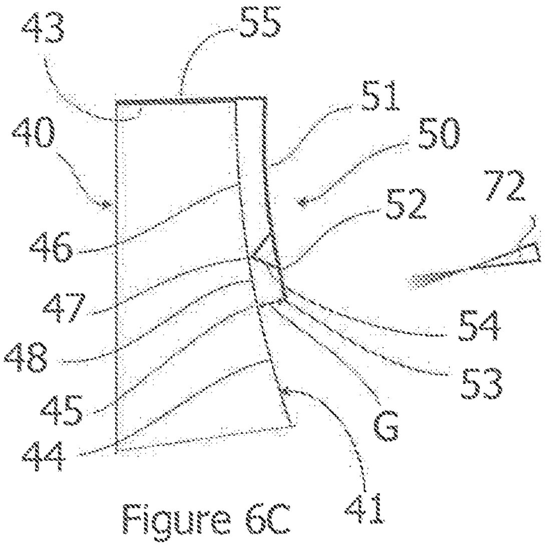

Turning to FIG. 6C, a third embodiment of the masking device 50 is shown. The third embodiment of the masking device 50 comprises a protrusion 54 arranged between the lip portion 52 and the body portion 51. The protrusion 54 contacts the mould surface 41 at the second boundary 47 and prevents the lip portion 52 from being forced to contact the mould surface 41 when coating is sprayed at the first longitudinal boundary 45 by the spray nozzle 72. Thus, the protrusion 47 maintains the gap G during coating application.

Figure 6D:
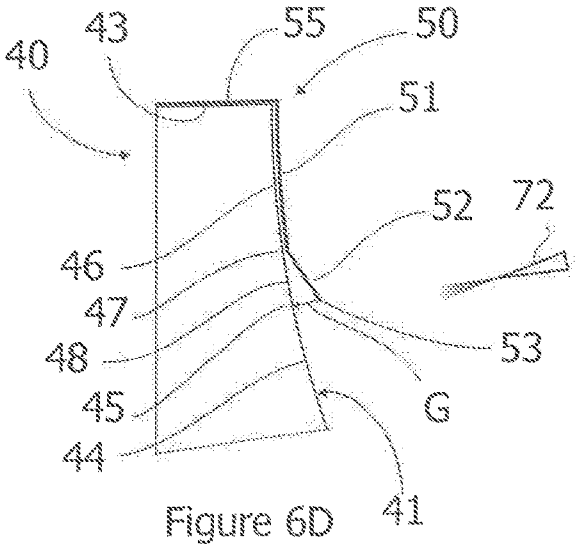

Lastly, a fourth embodiment is shown in FIG. 6D. The fourth embodiment differs from the first embodiment in that the lip portion 52, in its resting position as shown in FIG. 6D, is angled outwardly, away from the mould surface 41, so that when coating is applied and a spray force urges and deforms the lip portion 52 towards the mould surface 41, the angling of the lip portion 52 ensures that the lip portion 52 resists this deformation towards the mould surface 41. Thus, during coating application, the gap G is reduced but still maintained. In this embodiment, the body portion 51 preferably mates with the non-coating zone 46 of the mould surface 41.

LIST OF REFERENCES

| | |
|---|---|
| 2 | wind turbine |
| 4 | tower |
| 6 | nacelle |
| 8 | hub |
| 10 | blade |
| 13 | shell |
| 14 | blade tip |
| 15 | tip end |
| 16 | blade root |
| 17 | root end |
| 18 | leading edge |
| 20 | trailing edge |
| 24 | pressure side shell part |
| 26 | suction side shell part |
| 28 | bond line |
| 30 | root region |
| 32 | transition region |
| 34 | airfoil region |
| 36 | tip region |
| 38 | shoulder |
| 40 | mould |
| 41 | mould surface |
| 42 | longitudinal mould edge |
| 43 | mould flange |
| 44 | coating zone |
| 45 | first longitudinal boundary |
| 46 | non-coating zone |
| 47 | second boundary |
| 48 | transition zone |
| $W_{NC}$ | width |
| $W_T$ | width |
| 50 | masking device |
| 51 | body portion |
| 52 | lip portion |
| 53 | longitudinal masking edge |
| 54 | separation element |
| 55 | attachment portion |
| 56 | body joint |
| 57 | masking element |
| G | gap |
| 60 | clamp |
| 70 | applied coating |
| 71 | transitional coating |
| 72 | spray nozzle |

The invention claimed is:

1. A method of masking a mold for molding a shell part for a wind turbine blade, the wind turbine comprising an aerodynamic shell body with a suction side shell part and a pressure side shell part that extends in a longitudinal direction between a root and a tip and in a transverse direction between a leading edge and a trailing edge, the method comprising:

providing for molding a shell part, the mold comprising a mold surface having a longitudinal mold edge, a coating zone, and a non-coating zone, wherein the coating zone has a first longitudinal boundary arranged towards the non-coating zone, and wherein the non-coating zone extends longitudinally from the longitudinal mold edge to a second boundary towards the coating zone, and a masking device comprising a lip portion including a longitudinal masking edge;

arranging the masking device in the mold so that the masking device covers the non-coating zone of the mold surface and so that the longitudinal masking edge of the masking device delimits the first longitudinal boundary of the coating zone;

spraying a coating onto the mold surface so that the coating is applied to the coating zone, wherein the coating is prevented from being applied to the non-coating zone by an arrangement of the masking device; and removing the masking device from the mold so that the non-coating zone is exposed, wherein, prior to spraying of the coating, the masking device is biased by at least one of flaring the masking device outward from the mold surface or bending the masking device away from the mold surface, and wherein, during spraying of the coating at the first longitudinal boundary of the coating zone, the lip portion is forced into contact with the mold surface at least between the coating zone and the non-coating zone by a spray force, and, upon terminating spraying of the coating at the first longitudinal boundary of the coating zone, the lip portion of the masking device returns to a position in which the lip portion of the masking device is separated from the coating applied on the first longitudinal boundary of the coating zone by a gap.

2. The method of claim 1, wherein the mold surface comprises a transition zone extending longitudinally from the first longitudinal boundary of the coating zone to the second boundary of non-coating zone.

3. The method of claim 1, wherein the lip portion has a resting position in which the lip portion extends non-parallel to and is angled away from the mold surface.

4. The method of claim 1, further comprising arranging one or more clamps on the masking device so as to clamp the masking device to the mold surface.

5. The method of claim 1, wherein the gap between the lip portion of the masking device and the coating applied on the first longitudinal boundary of the coating zone is at least 0.1 mm.

6. The method of claim 1, wherein the gap between the lip portion of the masking device and the coating is at least 1.0 mm.

7. The method of claim 1, wherein a width of the non-coating zone from the longitudinal mold edge to the second boundary is in the range of 100-500 mm.

8. The method of claim 1, wherein the masking device comprises a plurality of individual masking elements each having a lip portion with a longitudinal masking edge.

9. The method of claim 8, wherein arranging the masking device in the mold comprises arranging the plurality of masking elements so that longitudinal masking edge of each masking element extend in parallel and substantially coincide to delimit the first longitudinal boundary of the coating zone.

10. The method of claim 1, wherein the masking device comprises a polymer material.

11. The method of claim 1, wherein arranging the masking device in the mold comprises attaching the masking device to the mold.

* * * * *